July 27, 1926.
L. A. JACKSON
1,594,098
ATTACHMENT FOR DRIVING WHEELS OF MOTOR VEHICLES
Filed July 18, 1924
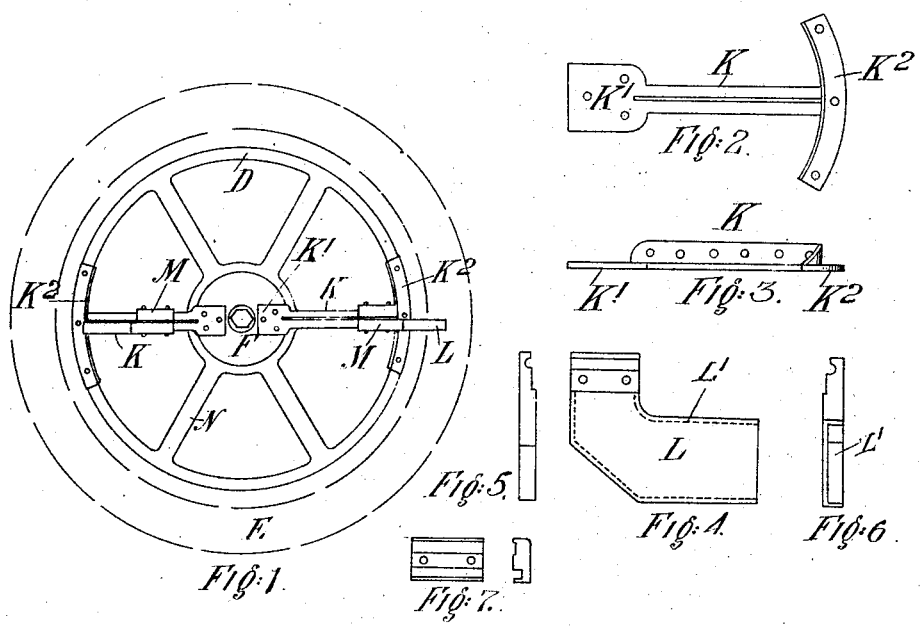
Inventor
L. A. Jackson
by Marker Clerk Patented July 27, 1926.

1,594,098

UNITED STATES PATENT OFFICE.

LEONARD ALFRED JACKSON, OF BRISBANE, QUEENSLAND, AUSTRALIA.

ATTACHMENT FOR DRIVING WHEELS OF MOTOR VEHICLES.

Application filed July 18, 1924, Serial No. 726,866, and in Australia March 10, 1924.

This invention relates to an attachment for driving wheels of motor vehicles to enable the same to negotiate bogs or sandy country without assistance, the object of which is to provide means for travelling in bad country without chains or other devices fixed to the tires of the wheels which are liable to injure the same.

The invention consists of two concentric metal rings connected together by square or T section metal spokes forming a skeleton wheel. The inner ring is fitted round the hub of the motor vehicle wheel and the outer ring bolted or otherwise suitably connected to the rim of the motor vehicle wheel to which it is attachable and detachable at pleasure.

To each of the spokes of the skeleton wheel are suitably fastened detachable and adjustable paddles which when travelling in boggy or sandy country grip the road.

The invention consists of a number of detachable T iron or steel carriers, the number depending upon the size of the motor wheel. The outer ends of these carriers are formed integrally with curved plates adapted to be bolted to the rim of the motor wheel and at their inner ends the web is cut away, their ends flattened and provided with holes for bolting same on to the hub of the motor wheel.

The web of the carriers is provided with a series of holes which allows the paddles to be bolted thereto in different positions according to requirements.

To fully describe the invention reference is now made to the accompanying drawings in which:—

Fig. 1 is an elevation of a motor wheel showing paddles attached to the carriers in different positions.

Fig. 2 is a plan view of a detachable carrier.

Fig. 3 is a side elevation of the same.

Fig. 4 is a front view of the paddle.

Fig. 5 is an end view from the left side.

Fig. 6 is an end view from the right side and illustrating the flange.

Fig. 7 is an end view of a coupling block.

Referring to the drawing, D is the rim of the motor wheel, E the rubber tire and F the hub of the wheel.

K are the carriers formed integrally with curved plate $K^2$ and flattened end $K'$, the latter being bolted to the hub of the wheel and the former to the rim of the wheel; L is an angular bracket or paddle suitably strengthened by flanges $L'$ and recessed at the heel for fitting onto the carrier K. M is a coupling block recessed in a similar manner as the heel of L; bracket L and block M being fastened by bolts. The carrier K is formed with flanges $L'$ and these paddles are bolted in required position to the web of the carriers by the coupling blocks M.

The advantages of the invention are: that in operation it packs the soil under or behind the blades on a track outside and distinct from that taken by the wheels of the vehicle and therefore the wheels have no tendency to dig themselves further into the ground; clogging or choking by mud is prevented; can easily be attached or detached from motor vehicle wheels without removing same and the tires are not subjected to any additional wear as in the use of other devices attached to the tires.

The invention as herein described, whilst obtaining the desired object may be varied in details of construction without departing from the spirit of the invention as expressed in the claims.

What I claim as my invention, and desire to secure by Letters Patent is:—

In improvements in attachments for motor vehicle wheels, carriers formed integrally with an arcuate head adapted to bolt on to the rim of the wheel, said carriers formed with flattened ends adapted to bolt on to the hub of the wheel and a central longitudinal web bored for adjustably attaching thereto paddles as and for the purpose set forth and as herein substantially described.

In testimony whereof I have signed my name to this specification.

LEONARD ALFRED JACKSON.